US008267826B2

(12) United States Patent
Duong et al.

(10) Patent No.: US 8,267,826 B2
(45) Date of Patent: Sep. 18, 2012

(54) UNINTERRUPTIBLE OIL SUPPLY IN PLANETARY SYSTEM

(75) Inventors: Loc Quang Duong, South Windsor, CT (US); Lawrence E. Portlock, Bethany, CT (US); Michael E. McCune, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 2405 days.

(21) Appl. No.: 11/080,175

(22) Filed: Mar. 15, 2005

(65) Prior Publication Data

US 2006/0223664 A1 Oct. 5, 2006

(51) Int. Cl.
*F16H 57/04* (2010.01)
*F16H 57/08* (2006.01)
(52) U.S. Cl. ........................................ 475/159; 475/331
(58) Field of Classification Search .................. 475/159, 475/160, 331, 348; 184/6.12
See application file for complete search history.

(56) References Cited

U.S. PATENT DOCUMENTS

| | | | |
|---|---|---|---|
| 5,102,379 A * | 4/1992 | Pagluica et al. | 475/331 |
| 5,466,198 A | 11/1995 | McKibbin et al. | |
| 6,602,158 B2 * | 8/2003 | Wildeshaus | 475/159 |
| 7,252,615 B2 * | 8/2007 | Kempf | 475/159 |
| 2002/0022545 A1 | 2/2002 | Shattuck et al. | |

FOREIGN PATENT DOCUMENTS

| | | |
|---|---|---|
| DE | 102 30 861 | 1/2004 |
| DE | 102 60 132 | 7/2004 |
| DE | 103 58 280 | 7/2004 |
| JP | 55-018699 | 2/1980 |
| JP | 57124124 | 8/1982 |
| JP | 7-208587 | 8/1995 |

OTHER PUBLICATIONS

European Search Report dated May 10, 2006.
Japanese Office Action mailed Aug. 5, 2008.

* cited by examiner

*Primary Examiner* — Roger Pang
(74) *Attorney, Agent, or Firm* — Carlson, Gaskey & Olds, P.C.

(57) ABSTRACT

A planetary carrier includes a journal bearing for supporting a planetary gear. The journal bearing receives lubricant to produce a lubricant film to support gear loads. A torque frame is attached to the carrier housing to transmit torque and to prevent twisting of the carrier housing. The torque frame includes several lubricant communication passages to provide lubricant to each of the separate journal bearings. Each of the lubricant communication passages includes an accumulator for storing lubricant during normal operation. The accumulator stores a desired amount of lubricant to provide lubricant to the adjacent journal bearing for the interim period between primary system stoppage and reestablishment of lubricant flow by a secondary system.

9 Claims, 3 Drawing Sheets

UNINTERRUPTIBLE OIL SUPPLY IN PLANETARY SYSTEM

BACKGROUND OF THE INVENTION

This application generally relates to an oil supply system for a planetary gear system. More particularly, this application relates to an uninterruptible oil supply system for a planetary gear system.

Conventional planetary gear assemblies include a carrier housing supporting rotation of various gears. Each gear is supported on a journal shaft and supplied with lubricant through passages within the journal shaft. Lubricant is delivered to the journal shaft by a primary delivery system. A secondary delivery system is typically included to provide lubricant if the primary delivery system fails. Although, the secondary system will continue lubricant delivery to the journal shaft and thereby to the gears, there is inevitably a time delay between failure of the primary delivery system and reestablishment of lubricant flow provided by the secondary delivery system. During the time delay lubricant is not provided to the journal shaft. The absence of lubricant can have undesired affects, especially in high-speed applications such as those commonly used in aircraft drive train applications.

Lubricant delivered to the journal shaft generates a lubricant film between the journal shaft and the gear supported thereon. The lubricant film is necessary to prevent undesirable contact between the gear and the journal shaft. During the interim between failure of the primary lubricant delivery system and engagement of the secondary system it is possible that the lubricant film will dissipate due to the temporary absence of lubricant, thereby allowing contact between with the gear and the journal shaft. This undesirable touchdown of the gear can cause undesirable damage and premature wear.

The carrier housing body typically experiences some degree of twisting caused by transmission of torque to the gears supported thereon, which can result in undesirable bearing misalignment. Such misalignment can cause premature wear or damage to the journal shaft. Typically, the effect of torsional twisting of the carrier housing is minimized by the application of a torque frame system. The torque frame provides support for the carrier housing and transmits torque through a shaft to an engine system. However, such a system does not provide an accommodation for the interim time period between failure of a primary lubricant system and engagement of the secondary lubricant system.

Accordingly it is desirable to design and develop a lubricant supply system that provides effective and reliable lubricant delivery in the interval between failure of the primary system and reestablishment of lubricant flow by a secondary system.

SUMMARY OF THE INVENTION

This invention is a system for providing and ensuring continuous lubricant delivery to a journal bearing in an interim period between failure of a primary lubricant delivery system and reestablishment of lubricant flow by a secondary lubricant delivery system.

The system of this invention includes a planetary carrier housing supporting a plurality of journal shafts, that in turn support a plurality of planetary gears. The journal shafts receive lubricant to produce a lubricant film that supports the gear. A torque frame is part of the carrier system and provides support for the carrier and transmits torque via a shaft to an engine supporting structure. The torque frame includes a lubricant passage that communicates lubricant starting from a first radial distance to the carrier housing body at a second radial distance. The carrier housing body supplies lubricant to journal shafts. Lubricant is delivered through the torque frame lubricant passages by a positive pressure. The torque frame includes several lubricant communication passages to provide lubricant to each of the separate journal shafts.

Each of the lubricant communication passages includes an accumulator for storing lubricant during normal operation. The accumulator stores a desired amount of lubricant to provide necessary lubricant to the adjacent journal shaft for the interim period between primary system failure and secondary system engagement. Lubricant from the accumulator is forced to the journal shaft by centrifugal force generated by rotation of the carrier housing body and torque frame. Flow of lubricant from the accumulator maintains a desired lubricant flow to each of the journal shafts until the secondary system can provided lubricant at desired pressures and flows.

Accordingly, the system and method of this invention includes a lubricant accumulator within the torque frame that provides lubricant supply to the journal shaft in the interim period prior to actuation of the secondary lubricant delivery system.

These and other features of the present invention can be best understood from the following specification and drawings, the following of which is a brief description.

DETAILED DESCRIPTION OF THE PREFERRED EMBODIMENT

Figure 1:
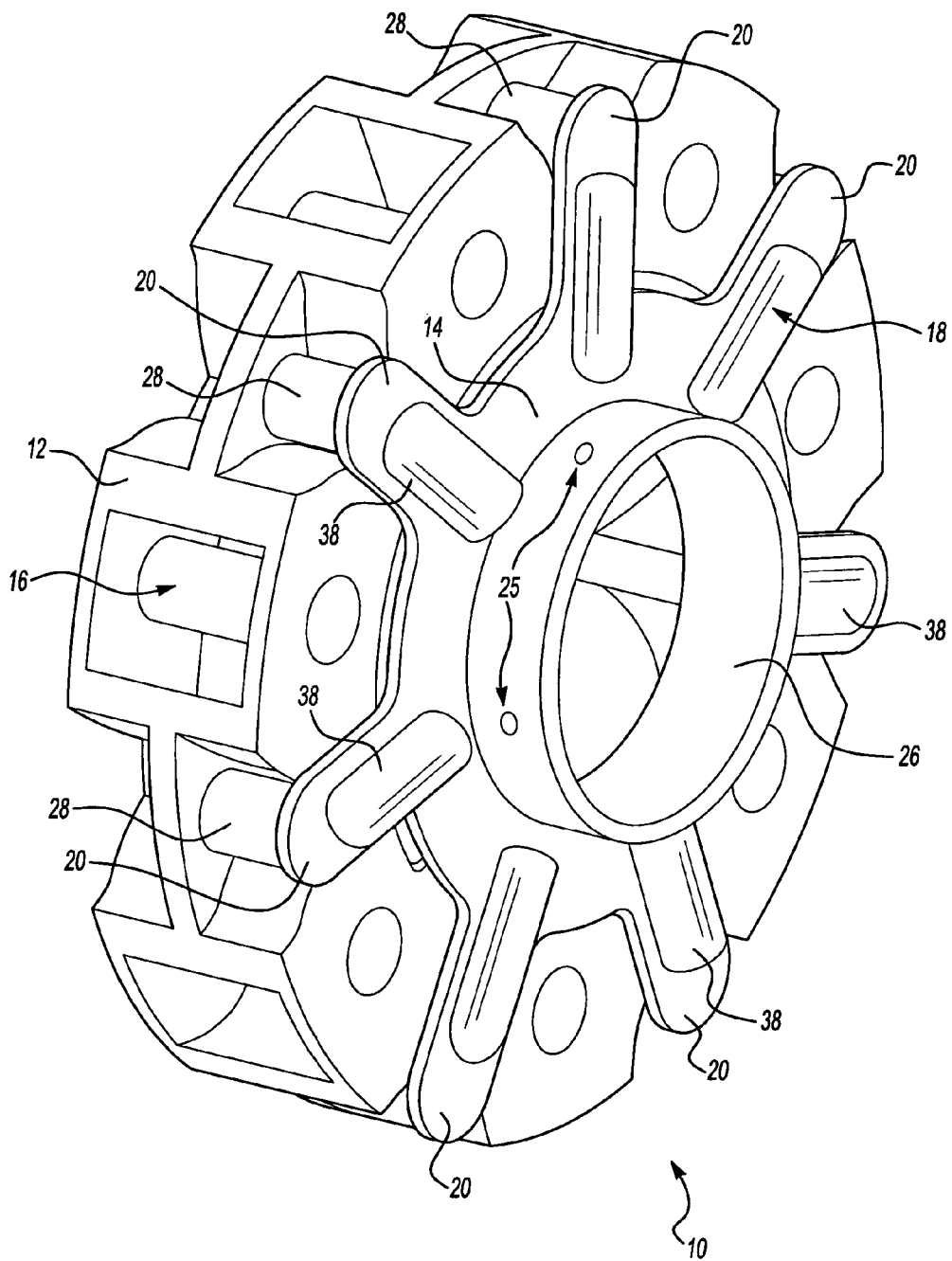
FIG. 1 is a perspective view of a planetary gear carrier according to this invention.
Figure 2:
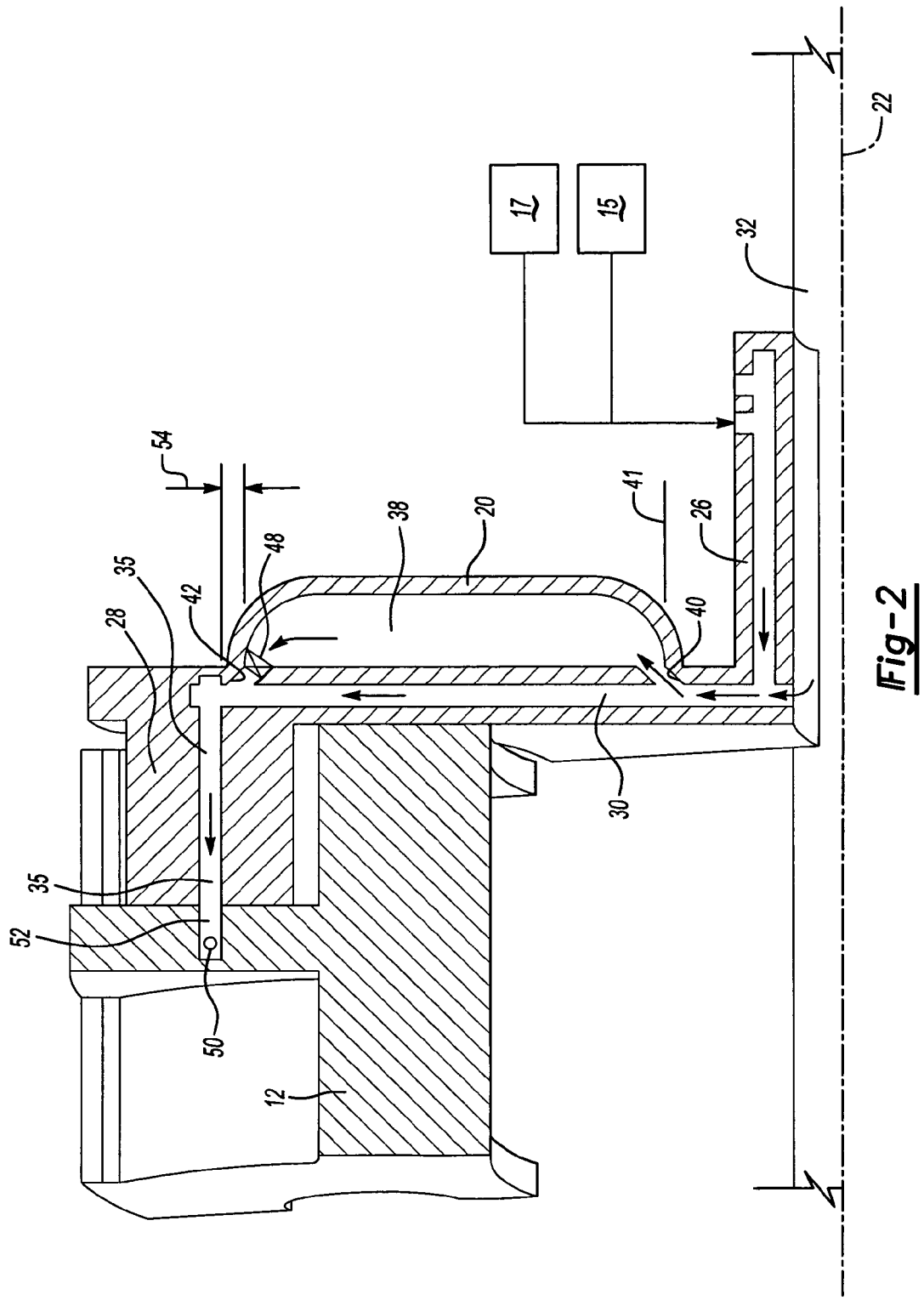
FIG. 2 is a cross-sectional view of a torque frame according to this invention.

Referring to FIG. 1 a planetary gear system 10 includes a carrier 12 and a torque frame 14 for transmitting torque to an output shaft (not shown) without imparting twisting the carrier 12. The carrier 12 supports a plurality of journal bearing shafts 16 that in turn support a corresponding plurality of planetary gears (not shown). Lubricant is provided through passages within the torque frame 14 to smooth operation of each of the planetary gears. Lubricant is provided by a primary system 15 (FIG. 2) that is supplemented with a secondary system 17 (FIG. 2). In the event that the primary system 15 can no longer supply lubricant, the secondary back-up system 17 engages and continues the supply of lubricant such that there is substantially little interruption of lubricant flow.

Even in optimal circumstances there is a delay in lubricant flow in the interim period between stoppage of the primary system and reestablishment of lubricant flow provided by the secondary back-up system 17. The torque frame 14 includes a plurality of accumulators 38 disposed adjacent lubricant passages to store lubricant during normal operation and provide lubricant in the interim period prior to engagement of the secondary system 17. The torque frame 14 includes a plurality of spokes 20 that extend radially outward from an outer hub 26. Each of the spokes 20 includes a boss 28 that attaches to the carrier 12. Lubricant is communicated through openings 25 in the outer hub 26 through a passage within each of the spokes 20, and bosses 28 to the carrier 12. Lubricant may be supplied directly from lubricant jets to the torque frame Referring to FIG. 2 one spoke 20 of the torque frame 14 is shown and includes the hub 26 that is attached to a shaft 32 rotating about an axis 22. Lubricant is supplied to the outer hub 26 and into the lubricant main passage 30. The accumulator 38 is disposed adjacent the main passage 30 and includes an inlet 40 and an outlet 42. The inlet 40 is disposed at a radial location 41 spaced apart from the axis 22. The radial distance provides for lubricant flow caused by centrifugal forces produced during rotation of the planetary gear system 10. During normal operation lubricant flows through the main passage 30 and into the carrier passage 52. The carrier passage 52 includes an opening 50 that communicates lubricant to the journal bearings 16 (FIG. 1).

A desired amount of lubricant determined by the volume of the accumulator 38 fills the accumulator 38. Lubricant within the accumulator 38 is continuously replenished such that there is a constant flow of lubricant through the accumulator 38. The outlet 42 can include an orifice 48 sized to limit the flow of lubricant. The orifice 48 is sized to provide a lower flow of lubricant than would otherwise be provided through the main passage 30.

In the event of primary system fault, lubricant will empty from the main passage 30 and begin being drawn from the accumulator 38. The outlet 42 is spaced radially apart a distance 54 from a portion of the passage 35 parallel to the axis 22 to create a positive pressure or head that drives the flow of lubricant. The inlet 40 is spaced apart from the axis 22. The distance from the axis 22 along with rotation of the planetary gear system 10 generates a centrifugal force that causes lubricant to flow radially outward.

The accumulator 38 includes a volume that is calculated to provide a desired amount of lubricant for a desired time. The desired time corresponds with the time delay that occurs prior to reestablishment of lubricant flow by the secondary system 17. The flow rate of lubricant from the accumulator 38 in this example can be set to the minimum flow rate required to maintain the journal bearing shaft 16 function. The lower flow rate provides a greater duration of lubricant availability from the stored lubricant within the accumulator 38. Lubricant flow to the journal bearing shafts 16 maybe reduced to provide the additional time.

Figure 3:
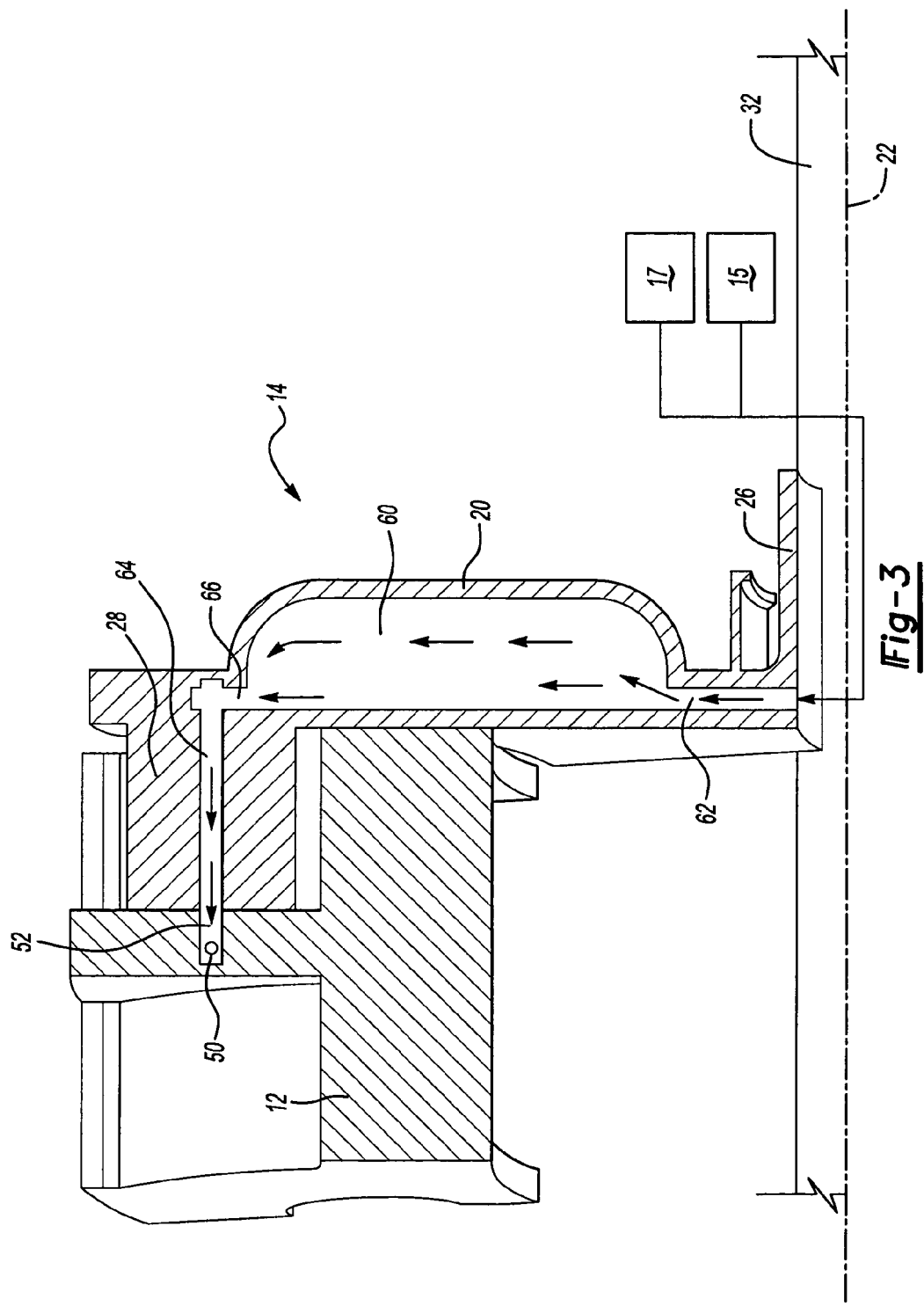
FIG. 3 is a cross-sectional view of another torque frame according to this invention.

Referring to FIG. 3, another example torque frame 14 according to this invention is shown in cross-section and includes an accumulator 60 that is an integral portion of the passage 62. The accumulator 60 defines a portion of the passage 62 for lubricant between the hub 26 and the boss 28. Lubricant flows radially outward through the spokes 20 from the hub 26 to the boss 28 and into the carrier 12. Lubricant fills the accumulator 60 due to a restriction 66 in the passage 64 that creates a slight backpressure that results in filling of the accumulator 60. Lubricant continuously fills the accumulator 60 during normal operation and empties when lubricant flow from the primary system 15 is interrupted.

The torque frame 14 can be connected through the boss 28 to the carrier housing body by fasteners such as bolts or screws (not shown). As the torque frame 14 and the carrier 12 are continuously rotating and generating centrifugal forces, the lubricant is forced into the carrier 12. The outlet 66 between the accumulator 60 and the passage 64 controls the flow of lubricant such that the accumulator 60 fills during normal operation, and to regulate emptying of lubricant at a predetermined desired flow rate during the interim period before reestablishment of lubricant flow by the secondary system 17.

In operation, lubricant is supplied by the primary system 15 by a positive pressure head or jets at a lower radial location such as at the hub 26 of the torque frame 14. The lubricant is then driven radially outward through the passage 62 in the torque frame 14 by centrifugal forces generated by rotation of the planetary gear system 10. Lubricant is restricted at the outlet 66 to provide for the continuous filling of the accumulator 60. In the event that the primary system 15 no longer functions and lubricant pressure and flow to the accumulator 60 is interrupted, flow from the accumulator 60 will continue for a predetermined period after the primary system 15 is no long providing lubricant. The duration that the accumulator 60 can supply flow to the journal bearing shaft 16 is determined to coincide with the time required to reestablish lubricant flow by with the secondary system 17. This provides for uninterrupted supply of lubricant to the journal bearing shafts 16.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A planetary gear train assembly comprising:
   a carrier housing supporting planetary gears;
   a torque frame attached to said carrier housing for preventing torque twisting of said carrier housing, wherein said torque frame includes a boss portion, said boss portion including an outlet communicating lubricant with said carrier housing;
   a lubricant passage for supplying lubricant through said torque frame and carrier housing to at least some of said planetary gears; and
   an accumulator disposed within said torque frame for storing a desired amount of lubricant in fluid communication with said lubricant passage.

2. The assembly as recited in claim 1, wherein said accumulator includes an inlet and an outlet both communicating with said lubricant passage.

3. The assembly as recited in claim 2 wherein said inlet includes an inlet orifice and said outlet includes an outlet orifice, said outlet orifice restricting flow of lubricant from said accumulator into said lubricant passage.

4. The assembly as recited in claim 1, wherein said torque frame includes a hub portion, said hub portion including an inlet for lubricant.

5. The assembly as recited in claim 4, wherein said accumulator is disposed radially outward of said inlet.

6. The assembly as recited in claim 1, including a bypass passage for directing lubricant around said accumulator.

7. The assembly as recited in claim 6, including an outlet orifice for regulating the flow of lubricant out of said accumulator and into the lubricant passage.

8. The assembly as recited in claim 1, wherein said torque frame includes a plurality of spokes extending radially outward from a hub, said accumulator disposed within at least one of said plurality of spokes.

9. The assembly as recited in claim 1, wherein said torque frame includes a plurality of accumulators disposed in a corresponding plurality of spokes extending radially outward from a hub.

* * * * *